G. H. DISCHER.
Combined Extension Measuring-Rods and Dividers.
No. 144,264. Patented Nov. 4, 1873.

Witnesses:
A Bennerkendorf.

Inventor:
G. H. Discher
Per
Attorneys.

UNITED STATES PATENT OFFICE.

GEORGE H. DISCHER, OF MOBILE, ALABAMA.

IMPROVEMENT IN COMBINED EXTENSION MEASURING-RODS AND DIVIDERS.

Specification forming part of Letters Patent No. 144,264, dated November 4, 1873; application filed August 30, 1873.

*To all whom it may concern:*

Be it known that I, GEORGE H. DISCHER, of Mobile, in the county of Mobile and State of Alabama, have invented a new and useful Improvement in Combined Extension-Rod and Tram, of which the following is a specification:

The object of this invention is to facilitate the taking of measurements between rigid surfaces and striking circles, arcs of circles, and ovals and elliptics; and it consists in an extension-rod having tram-fixtures, constructed and arranged as hereinafter described.

Figure 1:
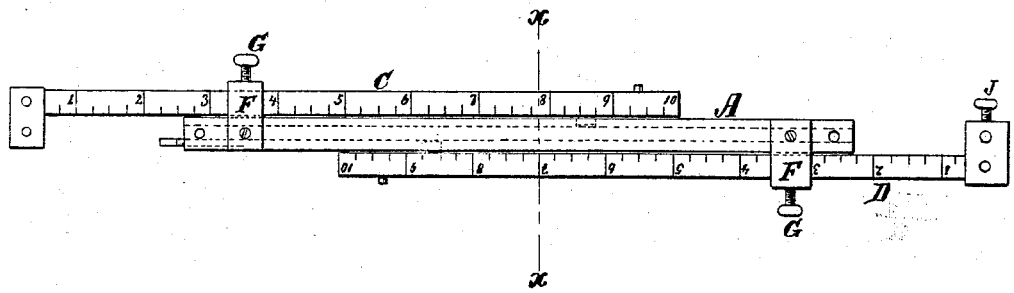
Figure 2:
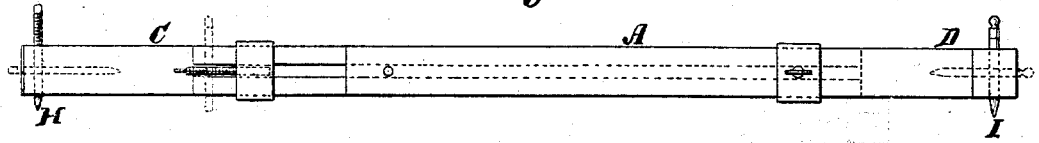
Figure 3:
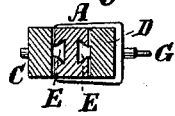

In the accompanying drawing, Figure 1 is a view showing the three parts of which the rod is composed. Fig. 2 is a side view, showing the tram-points and pencil. Fig. 3 is a cross-section of Fig. 1 taken on the line $x\ x$.

Similar letters of reference indicate corresponding parts.

A is the center piece, in each of two opposite sides of which is a dovetail groove. (Indicated by dotted lines in Fig. 1, and seen in full in the cross-section, Fig. 3.) C and D are extension-pieces. Near the inner ends of these extension-pieces are metallic dovetails E E, which fit into and slide in the dovetail grooves of the center piece, and guide and hold those pieces to the center piece. F F are hands attached to the center piece, which admit the extension-piece, as seen in Fig. 1, so that they may slide back and forth therein. G G are thumb-screws in the bands, by which the extension-pieces are held in any desired position. These extension-pieces are graduated or marked off into inches and fractions, so that the length of the rod in feet and inches may be, at any time, readily ascertained. H is a removable point, and I is a removable pencil, each fastened in place by a thumb-screw, J, when the rod is used as a tram for striking circles, arcs of circles, ovals, or elliptics. In the latter case the third point is attached to the end of the center piece.

When not used as a tram, the points and pencil may be disposed of in the ends of the pieces, as indicated in dotted lines.

This is a most useful and convenient instrument for all practical men, and especially for builders and other mechanics.

Having thus described my invention, I claim as new and desire to secure by Letters Patent—

1. A combined extension-rod and tram, constructed as herein shown and described.

2. The combination of the point and pencil, arranged in the ends of the extension-pieces C D, with center piece A, for the purposes set forth.

GEORGE HARMAN DISCHER.

Witnesses:
    JAS. H. HUTCHISSON,
    WILLIAM MARCH.